United States Patent [19]

Noack et al.

[11] 4,292,054
[45] Sep. 29, 1981

[54] APPARATUS FOR MONITORING THE TEMPERATURE OF ADSORBERS

[75] Inventors: Rolf Noack; Stefan Gramelt, both of Oberhausen, Fed. Rep. of Germany

[73] Assignee: Deutsche Babcock Aktiengesellschaft, Oberhausen, Fed. Rep. of Germany

[21] Appl. No.: 68,057

[22] Filed: Aug. 20, 1979

[30] Foreign Application Priority Data

Oct. 6, 1978 [DE] Fed. Rep. of Germany ....... 2843627

[51] Int. Cl.³ ............................................. B01D 53/08
[52] U.S. Cl. ........................................ 55/181; 55/217; 55/274; 55/390
[58] Field of Search ................. 55/20, 34, 60, 79, 99, 55/163, 181, 217, 274, 390, 474

[56] References Cited

U.S. PATENT DOCUMENTS

| | | | |
|---|---|---|---|
| 1,731,223 | 10/1929 | Brady | 55/474 X |
| 1,912,784 | 6/1933 | Miller et al. | 55/390 X |
| 3,359,706 | 12/1967 | Zankey | 55/20 |
| 3,395,510 | 8/1968 | Barnes | 55/20 |
| 3,902,485 | 9/1975 | Wallace | 55/274 X |
| 4,083,701 | 4/1978 | Noack | 55/20 |

FOREIGN PATENT DOCUMENTS 129520 1/1978 Fed. Rep. of Germany .......... 55/20

*Primary Examiner*—Robert H. Spitzer
*Attorney, Agent, or Firm*—Max Fogiel

[57] ABSTRACT

Apparatus for monitoring the temperature of adsorbers formed from several segments in which a traveling carbonaceous fill is located between two perforated walls, through which the gas to be cleaned flows. Each segment has on the gas outlet side several measuring elements, responding at a predetermined temperature and distributed over the height and width of the exit cross section. These measuring elements are electrically connected in series and their lead-ins are connected to a power source and an indicator instrument located outside the segment. On the outside perforated wall, insulators are located, with a continuous soldering wire placed between them. Prefabricated fusible cutouts may be used as measuring elements and may be connected by electrical lines. Semiconductor resistors may also be so used. Each segment may have a thermocouple on the gas exit side which can travel throughout the entire height of that side. Separately charged ntirogen lines may be provided for cooling.

8 Claims, 3 Drawing Figures

APPARATUS FOR MONITORING THE TEMPERATURE OF ADSORBERS

BACKGROUND OF THE INVENTION

The present invention relates to apparatus for monitoring the temperature of adsorbers which are formed by several segments holding a moving carbonaceous fill through which a gas flows to be cleaned.

Such adsorbers are preferably used for removing sulfur dioxide from flue gases of power plants or of similar sulfurous gases. Oxidation of adsorbed sulfur oxides into sulfuric acid takes place in the fill of these adsorbers, resulting in a temperature increase of the adsorption agent resulting from the heat of adsorption and reaction. During normal operation, the accumulated heat is carried away by the gas to be cleaned. Under unfavorable operating conditions, in case of insufficient cooling or with the entry of outside air, the carbonaceous adsorption agent may heat up so that the ignition limit is reached and heat pockets are formed. The more reactive the adsorption agent regarding the sulfur dioxide adsorption, the greater is the danger of spontaneous combustion. The heat pockets lead to more intensive combustion and hence to losses of adsorption agent. Therefore, it is necessary to recognize temperature variations in the fill at an early stage without excessive measuring efforts.

It is an object of the present invention to develop an economical apparatus for an adsorber of the above type which allows early indication of a temperature increase inside the fill.

Another object of the present invention is to provide an arrangement of the foregoing character which is simple in construction, and may be economically fabricated, and has a long service life.

SUMMARY OF THE INVENTION

The objects of the present invention are achieved by providing inside each segment on the gas exit side several measuring elements which respond to a specific temperature and are distributed over the height and width of the exit cross section, are electrically connected in series and whose lines lead to a power source outside the segment and to a display device.

The apparatus according to the invention determines the temperature of the departing gas. An increase in gas temperature at a point in the gas duct indicates the presence of a heat pocket in the fill. Even though with this apparatus the temperature pattern over a major portion of the cross section can be monitored, the apparatus is not very costly. This is achieved by doing without determining the temperature as to its absolute amount and distribution across the cross section and only recording the reaching and passing of a hazardous temperature. If a single location within a segment indicates that this temperature has been reached at any point inside the segment, the adsorber is disconnected from the gas supply, and proper countermeasures are initiated. The temperature to be indicated can be obtained by selecting a suitable material for the measuring element.

Fusible cutouts or semiconductor resistors of known design may be used as measuring elements. A particularly simple device of this type is obtained by locating insulators on the outside of the perforated wall between which insulators a solder wire is placed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
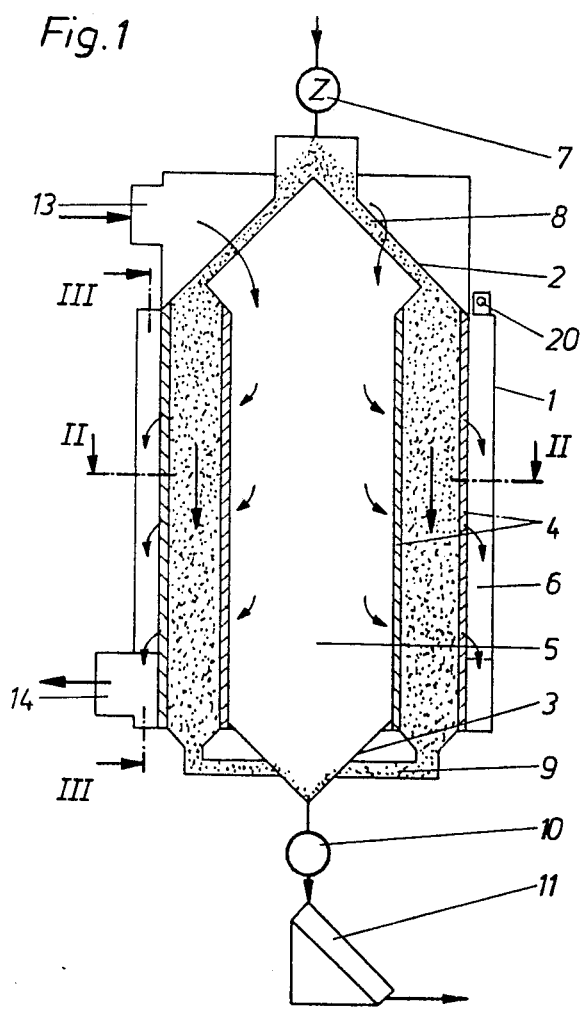
FIG. 1 shows a lengthwise section through an adsorber.

The adsorber shown in FIG. 1 is used for the removal of sulfur dioxide from the flue gases of a boiler plant. It consists of a housing with a cylindrical outer jacket 1, a roof 2 and a bottom 3. Inside the housing, two concentric perforated walls 4 of louvered inclined sheet metal are arranged such that on the inside a central gas supply duct 5 and on the outside an annular gas outlet duct 6 develops. A fill of carbonaceous adsorption agent is placed between the perforated walls 4. The adsorption agent is activated carbon or activated coke. The granular adsorption agent is fed into the adsorber via a feeder gate 7 and through a pipe system 8 in the roof 2 of the adsorber travels to the space between the perforated walls 4. The adsorption agent travels through the adsorber and is removed via chutes 9 in the bottom of the adsorber and an outlet gate 10 at a controlled speed. The collected dust is separated in a sieve 11 and then the adsorption agent is delivered to a regeneration plant (not shown).

The central gas supply duct 5, the space between the perforated walls 4 and the outer gas outlet duct 6 is divided into segments by radially arranged metal sheets 12. The flue gas to be cleaned, after it has flown through a dust separator, is fed through an entry opening 13 in roof 2 to the adsorber at a temperature of about 100° to 140° C. It flows in parallel individual flows through the fill between the perforated walls 4 and is removed via a gas exit connection 14 which follows the gas outlet duct 6.

Figure 3:
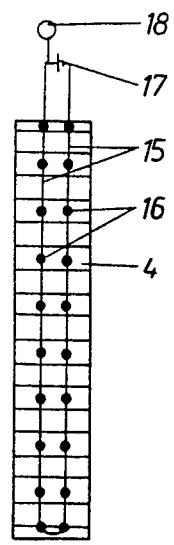
FIG. 3 shows a section taken along line III—III in FIG. 1.
Figure 2:
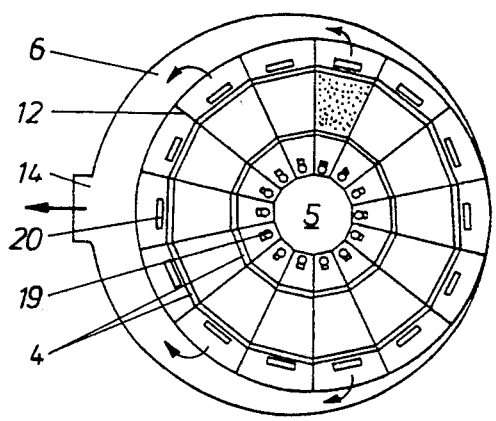
FIG. 2 shows a section taken along line II—II in FIG. 1.

In order to identify heat pockets inside the fill, a measuring device is arranged inside each segment on the gas exit side in the gas outlet duct 6. This measuring device consists, as shown in FIG. 3, of a continuous wire 15 which is guided in a loop through the gas outlet duct 6. The wire is made of a known solder whose composition is such that its melting temperature is about 170°–180° C. The wire 15 is tied around insulators 16 which are fastened to the outer perforated wall 4. The outside ends of the wire 15 are electrically connected to a power source 17 and an indicating instrument 18.

If the soldering wire 15 melts at a specific location, the temperature at that point has exceeded the set value which means that the temperature in the fill has risen unduly at that point. The melting of the solder and the break in the continuous wire can be noted on the indicating instrument 18. In that case, the flue gas supply to the adsorber is blocked by a slide located in the input portion of the gas supply duct 5. At the same time, liquid nitrogen is blown, via a vertical duct 19 placed in each segment of the gas supply duct 5, into the fill and the fill is cooled.

With this extremely simple measuring arrangement, one can determine whether a heat pocket is present inside the fill of a segment. In order to determine the height of the heat pocket more exaclty, the involved segment can be traversed via steel cable and winch by a thermocouple 20 from the top to the bottom. The vertical dimension of the adsorber can be scanned continuously or stepwise with this thermocouple 20. The heat pocket located in this manner can then be successfully charged with nitrogen.

Instead of a continuous wire 15, prefabricated fusible cutouts may be used as measuring elements. These fusible cutouts are located at the points wherein FIG. 3 the insulators 16 are located. Such fusible cutouts are known and consist of current-carrying contacts between which a material melting at a predetermined temperature will melt. The contacts of the fusible cutouts are connected via an electrical wire in series. With this measuring arrangement the ends of the electrical wires also lead to an indicating instrument and a power source, as shown in FIG. 3.

Semiconductor resistors can be used in a similar manner. These semiconductor resistors are known as PTC or NTC resistors and have the feature that upon reaching a predetermined temperature, the resistance suddenly changes. With this measuring arrangement, the resistance change on the indicator is used to indicate that a predetermined temperature has been reached.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims;

What is claimed is:

1. Apparatus for monitoring the temperature of adsorbers, comprising: a plurality of segments for holding a traveling carbonaceous fill between two perforated walls with gas flowing through the fill to be cleaned, a plurality of measuring elements arranged inside each of said segments on a gas outlet side, said measuring elements responding at a predetermined temperature, said measuring elements being distributed over height and width of an exit cross section of said adsorber, said measuring elements being electrically connected in series, said measuring elements having lead-ins connected to a power source, and indicator means connected to said lead-ins and located outside each of said segments, a measuring element becoming actuated when the temperature exceeds a predetermined magnitude at a location in said exit cross section, said measuring element corresponding to said location in said exit cross section, actuation of said measuring element actuating thereupon said indicator means to indicate the temperature condition, whereby an intolerable temperature rise within said traveling carbonaceous fill held between said two perforated walls is prevented.

2. An apparatus as defined in claim 1 including insulators outside one of said perforated walls; and a continuous soldering wire placed between said insulators.

3. An apparatus as defined in claim 1 wherein said measuring elements are prefabricated fusible cutouts connected by electrical lines.

4. An apparatus as defined in claim 1 wherein said measuring elements are semiconductor resistors connected by electrical lines.

5. An apparatus as defined in claim 1 including a thermocouple in each of said segments on a gas exit side, said thermocouple being movable throughout an entire height of said gas exit side.

6. An apparatus as defined in claim 1 including a gas supply duct, and one nitrogen line in each of said segments, each nitrogen line being charged separately.

7. An apparatus as defined in claim 1 including insulators outside one of said perforated walls; a continuous soldering wire placed between said insulators; said measuring elements being prefabricated fusible cutouts connected by electrical lines; a thermocouple in each of said segments on a gas exit side, said thermocouple being movable throughout and entire height of said gas exit side; a gas supply duct, and one nitrogen line in each of said segments, each nitrogen line being charged separately.

8. Apparatus as defined in claim 1 wherein said adsorber is used for removal of sulfur dioxide from flue gases of a boiler plant, a housing with a cylindrical outer jacket, roof means and bottom means; said perforated walls being concentric inside said housing and being of louvered inclined sheet metal, said fill being of a carbonaceous adsorption agent in form of activated carbon fed into said adsorber by a feeder gate through a pipe system in said roof means, said adsorption agent after traveling through the adsorber being removed by chutes in said bottom means and through an outlet gate at a controlled speed; sieve means for separating collected dust; flue gas to be cleaned after passing through said sieve means being fed through an entry opening in said roof means to said adsorber at a temperature of substantially 100° to 140° C. and flowing in parallel individual paths through the fill between said perforated walls and being removed through a gas exit means; said measuring elements comprising a continuous wire guided by a loop through gas outlet, said wire being comprised of solder and tied around insulators fastened to an outer perforated wall, said wire having outside ends electrically connected to said power source, said solder wire melting when the temperature at a location has exceeded a predetermined set value, melting of the solder and resulting break in the continuous wire being displayed by said indicating means; means for blocking flue gas supply to the adsorber upon melting of the solder, and vertical duct means in each segment for simultaneously blowing in liquid nitrogen into the fill for cooling the fill upon melting of the solder.

* * * * *